United States Patent
Kitamura et al.

(10) Patent No.: US 8,707,936 B2
(45) Date of Patent: Apr. 29, 2014

(54) CONTROL SYSTEM FOR INTERNAL COMBUSTION ENGINE

(75) Inventors: Toru Kitamura, Saitama-ken (JP);
Toshinari Shinohara, Saitama-ken (JP);
Chiho Itoga, Saitama-ken (JP); Ken Ogawa, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 993 days.

(21) Appl. No.: 12/747,347

(22) PCT Filed: Oct. 15, 2008

(86) PCT No.: PCT/JP2008/068649
§ 371 (c)(1),
(2), (4) Date: Jun. 10, 2010

(87) PCT Pub. No.: WO2009/096072
PCT Pub. Date: Aug. 6, 2009

(65) Prior Publication Data
US 2010/0269801 A1    Oct. 28, 2010

(30) Foreign Application Priority Data
Jan. 30, 2008 (JP) .................. 2008-018560

(51) Int. Cl.
*F02M 25/07* (2006.01)
*F01L 1/34* (2006.01)
*G06F 7/00* (2006.01)

(52) U.S. Cl.
USPC ............... 123/568.14; 123/90.15; 701/105; 701/108

(58) Field of Classification Search
USPC ............... 123/90.15, 90.16, 568.14, 321, 123/345–348; 701/105, 108
See application file for complete search history.

(56) References Cited

U.S. PATENT DOCUMENTS

| 6,494,185 | B2 * | 12/2002 | Iwasaki et al. ............... 123/478 |
| 8,096,279 | B2 * | 1/2012 | Kuzuyama .................. 123/295 |
| 2001/0027783 | A1 | 10/2001 | Hiraya et al. | |
| 2002/0059914 | A1 | 5/2002 | Yamaguchi et al. | |
| 2011/0192364 | A1 * | 8/2011 | Hayashi et al. ............ 123/90.15 |

FOREIGN PATENT DOCUMENTS

| JP | 2001-280165 A | 10/2001 |
| JP | 2001-289092 A | 10/2001 |
| JP | 2002-155780 A | 5/2002 |
| JP | 2002-242715 A | 8/2002 |
| JP | 2003-003873 A | 1/2003 |
| JP | 2004-011539 A | 1/2004 |

* cited by examiner

*Primary Examiner* — Mahmoud Gimie
*Assistant Examiner* — David Hamaoui
(74) *Attorney, Agent, or Firm* — Arent Fox LLP (57) ABSTRACT

To provide a control system for an internal combustion engine, which is capable of providing a stable intake air amount through reduction of pumping loss and blow-back of combustion gases by appropriately controlling the valve-opening timing of the intake valves, and thereby being capable of securing excellent drivability. In the control system 1, the valve-closing timing of the exhaust valve 9 is changed by an exhaust-side variable valve-operating mechanism 60, whereby the internal EGR amount is controlled, and the valve-opening timing of an intake valve 8 of an internal combustion engine 3 is changed by an intake-side variable valve-operating mechanism 40. Further, a target valve-opening timing CAINVO serving as a target of the valve-opening timing of the intake valve 8 is set such that the length of time from the top dead center of a piston 3*b* at the start of the intake stroke to the valve-opening timing of the intake valve 8 becomes equal to the length of time from the valve-closing timing of the exhaust valve 9 to the top dead center, and based on the target valve-opening timing, the intake-side variable valve-operating mechanism is controlled. Further, as the valve-closing timing of the exhaust valve 9, one of the detected actual valve-closing timing and the set target valve-closing timing is used.

1 Claim, 11 Drawing Sheets

CONTROL SYSTEM FOR INTERNAL COMBUSTION ENGINE

FIELD OF THE INVENTION

The present invention relates to a control system for an internal combustion engine, for controlling internal EGR in which combustion gases are caused to remain in cylinders.

BACKGROUND ART

Conventionally, as a control system of this kind, there has been known, for example, one disclosed in Patent Literature 1. In this control system, a so-called negative overlap amount between an exhaust valve and an intake valve in which the intake valve is opened after the exhaust valve is completely closed is set, and the valve-closing timing of the exhaust valve and the valve-opening timing of the intake valve are changed according to the set negative overlap amount to thereby control the amount of combustion gases remaining in the cylinder (hereinafter referred to as "internal EGR amount"), whereby the temperature of working medium (mixture gas of air and fuel before combustion) is controlled to a temperate at which compression ignition is possible. More specifically, according to intake air temperature, the temperature of working medium at the start of the compression stroke is calculated, and a target internal EGR amount is calculated such that the temperature of the working medium becomes a temperature at which compression ignition is possible. Then, based on the target internal EGR amount, the negative overlap amount is calculated, and according to the calculated negative overlap amount, the valve-closing timing of the exhaust valve and the valve-opening timing of the intake valve are changed.

As described above, in the conventional control system, during compression ignition, the control of the internal EGR amount is performed by negative overlap, and the valve-closing timing of the exhaust valve and the valve-opening timing of the intake valve are set according to the target internal EGR amount. Therefore, the length of time elapsed after the valve-closing timing of the exhaust valve until the top dead center position of the piston at the start of the intake stroke and the length of time elapsed after the top dead center position until the valve-opening timing of the intake valve are sometimes different from each other. In such a case, the intake valve is opened in a state in which the energy generated by the reciprocating motion of the piston is not fully cancelled out, to increase pumping loss, which causes lowering of the engine output and degradation of fuel economy. Especially, if the valve-opening timing of the intake valve is too early, the combustion gases are blown back toward the intake side, which makes the amount of intake air unstable, so that the state of combustion becomes unstable and torque variation increases, resulting in degraded drivability.

The present invention has been made to provide a solution to the above-described problem, and an object thereof is to provide a control system for an internal combustion engine, which is capable of securing excellent drivability by properly controlling the valve-opening timing of an intake valve to make stable the amount of intake air through reduction of pumping loss and the blow-back of combustion gases.

[Patent Literature 1]
Japanese Laid-Open Patent Publication (Kokai) No. 2001-289092

DISCLOSURE OF THE INVENTION

To attain the object, the invention as claimed in claim 1 provides a control system 1 for an internal combustion engine 3, for controlling internal EGR in which combustion gases are caused to remain in a cylinder 3*a* by closing an exhaust valve 9 before a piston 3*b* reaches a top dead center, comprising an exhaust-side variable valve-operating mechanism (exhaust-side valve-operating mechanism 60 in the embodiments (the same applies hereinafter in this section)) that controls an internal EGR amount by changing valve-closing timing of the exhaust valve 9, an intake-side variable valve-operating mechanism (intake-side valve-operating mechanism 40) that changes valve-opening timing of an intake valve 8 of the engine 3, target valve-opening timing-setting means (ECU 2, steps 26, 27, 29 in FIG. 11) for setting target valve-opening timing (valve-opening crank angle CAINVO) serving as a target of the valve-opening timing of the intake valve 8, such that length of a time period from the top dead center of the piston 3*b* to the valve-opening timing of the intake valve 8 becomes equal to length of a time period from the valve-closing timing of the exhaust valve 9 to the top dead center, control means (ECU 2) for controlling the intake-side variable valve-operating mechanism based on the set target valve-opening timing, operating condition-detecting means (crank angle sensor 21, accelerator pedal opening sensor 30, ECU 2) for detecting an operating condition (engine speed NE, accelerator pedal opening AP) of the engine 3, target valve-closing timing-setting means (ECU 2, step 16 in FIG. 10) for setting target valve-closing timing (target valve-closing crank angle CAEXVC) serving as a target of the valve-closing timing of the exhaust valve 9, according to the detected operating condition of the engine, and actual valve-closing timing-detecting means (lift sensor 23, exhaust cam angle sensor 24, ECU 2, step 21 in FIG. 11) for detecting actual valve-closing timing (actual valve-closing crank angle CAEXACT) of the exhaust valve 9, wherein the target valve-opening timing-setting means uses one of the actual valve-closing timing and the target valve-closing timing of the exhaust valve 9 as the valve-closing timing of the exhaust valve 9, based on a result of comparison between the actual valve-closing timing and the target valve-closing timing of the exhaust valve 9.

According to this control system, the valve-closing timing of the exhaust valve which is closed before the piston reaches the top dead center is changed by the exhaust-side variable valve-operating mechanism, whereby the amount of internal EGR in which combustion gases are caused to remain within the cylinder is controlled. Further, the valve-opening timing of the intake valve is changed by the intake-side variable valve-operating mechanism. The target valve-opening timing serving as the target of the valve-opening timing of the intake valve is set such that the length of a time period from the top dead center of the piston becomes equal to the length of a time period from the valve-closing timing of the exhaust valve to the top dead center. The intake-side variable valve-operating mechanism is controlled based on the set target valve-opening timing. This makes the valve-opening timing of the intake valve and the valve-closing timing of the exhaust valve equal in the length of a time period therefrom to the top dead center therebetween. Therefore, the intake valve can be opened in optimum timing in which energy generated by the reciprocating motion of the piston is cancelled out. As a result, a stable intake air amount can be obtained by reduction of pumping loss and the blow-back of combustion gases, whereby excellent drivability can be secured.

Further, the target valve-closing timing serving as the target of the valve-closing timing of the exhaust valve is set according to the detected operating condition of the engine, and the valve-closing timing of the exhaust valve is changed such that it becomes the target valve-closing timing. The actual valve-closing timing of the exhaust valve is detected by the actual valve-closing timing-detecting means. Then, based on a result of comparison between the target valve-closing timing and the actual valve-closing timing, one of them is used as the valve-closing timing of the exhaust valve, whereby the target valve-opening timing of the intake valve is set. This makes it possible to set the target valve-opening timing of the intake valve by using the more appropriate one of the two, according to the relationship between the target valve-closing timing and the actual valve-closing timing of the exhaust valve.

For example, when the actual valve-closing timing largely deviates from the target valve-closing timing, the actual valve-closing timing is used as the valve-closing timing of the exhaust valve, whereby the valve-opening timing of the intake valve can be appropriately controlled according to the actual valve-closing timing of the exhaust valve. On the other hand, when the actual valve-closing timing is substantially equal to the target valve-closing timing, by using the target valve-closing timing, it is possible to appropriately control the valve-opening timing of the intake valve in a stable manner, even when the actual valve-closing timing temporarily fluctuates, in a state in which the influence caused thereby is cancelled out.

The invention as claimed in claim 2 is the control system 1 as claimed in claim 1, wherein the engine 3 has a homogeneous combustion mode and a stratified combustion mode, as the combustion mode, the control system 1 further comprising switching determining means (ECU 2, step 24 in FIG. 11) for determining whether or not the combustion mode is being switched, and the target valve-opening timing-setting means calculates an average value EXVCAVE of a difference ΔEXVC between the actual valve-closing timing and the target valve-closing timing of the exhaust valve 9, and when it is determined that the combustion mode is being switched, uses a value (corrected valve-closing crank angle CAEXREF) obtained by adding the average value EXVCAVE to the target valve-closing timing of the exhaust valve 9, as the valve-closing timing of the exhaust valve 9.

When the combustion mode of the engine is being switched, the target valve-closing timing of the exhaust valve is sometimes largely changed, and deviation of the actual valve-closing timing therefrom sometimes becomes large. According to the present invention, the average value of the difference between the actual valve-closing timing and the target valve-closing timing of the exhaust valve is calculated, and when the combustion mode is being switched, the value obtained by adding the average value to the target valve-closing timing is used as the valve-closing timing of the exhaust valve. The average value corresponds to a value obtained by averaging the deviation of the actual valve-closing timing from the target valve-closing timing, and hence even when the actual valve-closing timing temporarily largely deviates from the target valve-closing timing, the intake valve can be opened in appropriate timing in which influence caused thereby is cancelled out.

BEST MODE FOR CARRYING OUT THE INVENTION

Figure 1:
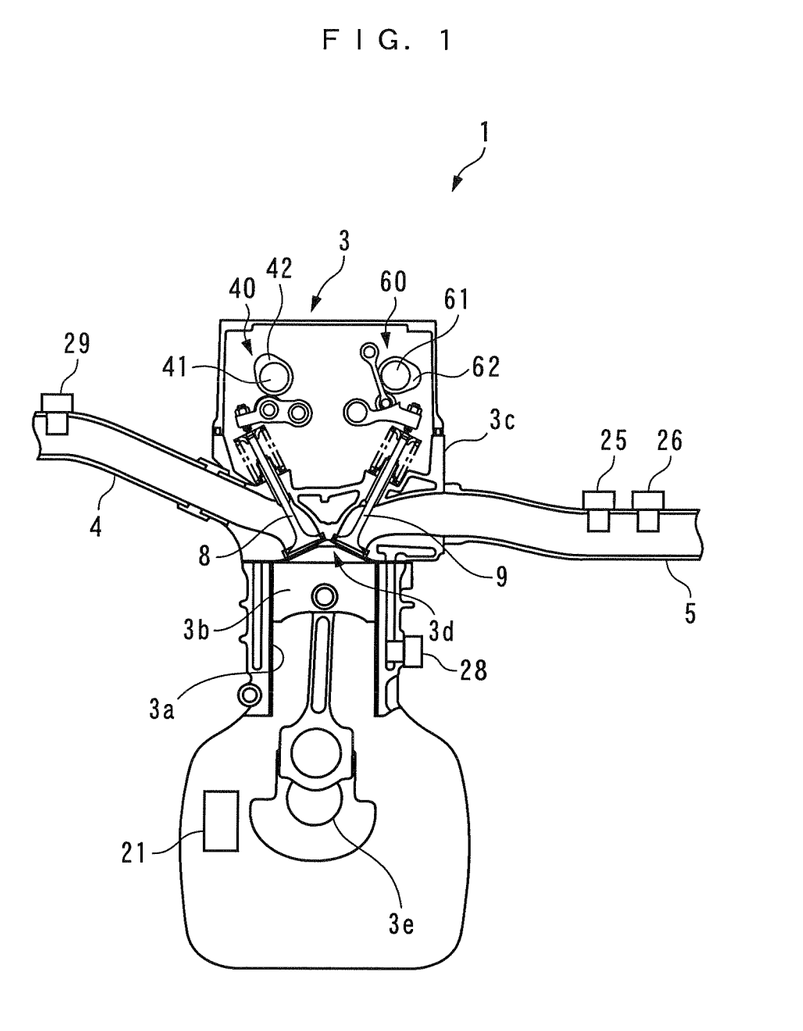
FIG. 1 A schematic view of a control system according to the invention and an engine incorporating the same.

Hereafter, the invention will now be described in detail with reference to drawings showing preferred embodiments thereof. FIG. 1 schematically shows the arrangement of a control system 1 according to an embodiment of the present invention and an internal combustion engine 3 (hereinafter simply referred to as the "engine") to which the control system 1 is applied. The engine 3 is a four-cylinder gasoline engine that has four cylinders 3a (only one of which is shown), and is installed on a vehicle, not shown.

The engine 3 has a cylinder head 3c having an intake pipe 4 and an exhaust pipe 5 connected thereto, and fuel injection valves 6 and spark plugs 7 (see FIG. 2) mounted therethrough such that they face associated combustion chambers 3d of the cylinders 3a (only one of which is shown for each). The fuel injection valve 6 is of a direct fuel-injection type which is configured to directly inject fuel to the vicinity of the spark plug 7 in the combustion chamber 3d. The fuel injection amount and fuel injection timing of the fuel injection valve 6 are controlled by controlling the valve-opening time period and the valve-opening timing thereof by an ECU 2 (see FIG. 2). The ignition timing of the spark plug 7 is also controlled by the ECU 2. Further, the engine 3 performs spark ignition combustion (hereinafter referred to as "the SI combustion") in which an air-fuel mixture supplied to the combustion chamber 3d is ignited by the spark of the spark plug 7, and compression ignition combustion (hereinafter referred to as "the CI combustion") in which an air-fuel mixture is ignited by compression ignition, and the switching of the combustion therebetween is controlled by the ECU 2.

Further, each cylinder 3a has a pair of intake valves 8 and 8 (only one of which is shown), and a pair of exhaust valves 9 and 9 (only one of which is shown) disposed therein. The intake valves 8 and 8 are opened and closed by an intake-side valve-operating mechanism 40, and the exhaust valves 9 and 9 are opened and closed by an exhaust-side valve-operating mechanism 60. A description will be given of the intake-side valve-operating mechanism 40 and the exhaust-side valve-operating mechanism 60 with reference to FIGS. 3 to 7.

Figure 4:
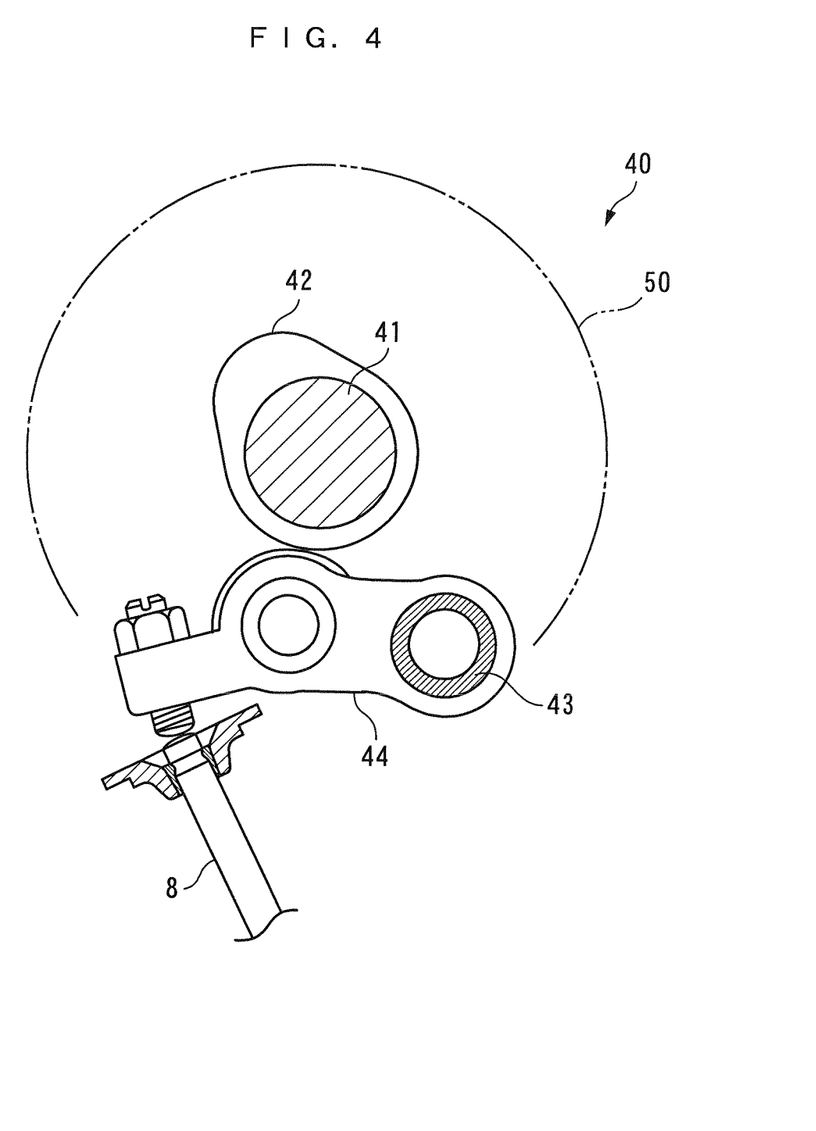
FIG. 4 A schematic view of an intake-side valve-operating mechanism.

The intake-side valve-operating mechanism 40 is formed by a variable valve-operating mechanism that steplessly changes the valve timing of the intake valves 8, and as shown in FIG. 4, is comprised of a rotatable intake cam shaft 41, an intake cam 42 integrally formed with the intake cam shaft 41, a rocker arm shaft 43, two rocker arms 44 and 44 (only one of which is shown) which are pivotally supported by the rocker arm shaft 43 for being brought into abutment with respective top ends of the intake valves 8 and 8, and a variable intake cam phase mechanism 50.

The intake cam shaft 41 is connected to a crankshaft 3e via an intake sprocket and a timing chain (neither of which is shown), and rotates once whenever the crankshaft 3e rotates twice. As the intake cam shaft 41 is rotated, the rocker arms 44 and 44 are pressed by the intake cam 42 to be pivoted about the rocker arm shaft 43, whereby the intake valves 8 and 8 are opened and closed.

The variable intake cam phase mechanism 50 steplessly changes the phase CAIN of the intake cam shaft 41 relative to the crankshaft 3e (hereinafter referred to as the "intake cam phase") to an advanced side or a retarded side. The arrangement of the variable intake cam phase mechanism 50 is similar to that proposed in Japanese Laid-Open Patent Publication (Kokai) No. 2005-315161 by the present applicant, and hence hereinafter, a brief description will be given of an outline thereof.

The variable intake cam phase mechanism 50 is disposed at an end of the intake cam shaft 41 toward an intake sprocket, and is comprised of an intake cam phase electromagnetic valve 51 (see FIG. 2), and an advancing chamber and a retarding chamber (neither of which is shown) into which oil pressure is supplied through the intake cam phase electromagnetic valve 51. The intake cam phase electromagnetic valve 51 is connected to the ECU 2, and continuously steplessly varies the intake cam phase CAIN between a predetermined most retarded value and a predetermined most advanced value, by varying oil pressure supplied to the advancing chamber and the retarding chamber according to an intake phase control input U_CAIN delivered from the ECU 2. This steplessly changes the valve timing of the intake valves 8 between the most retarded timing indicated by a solid line and the most advanced timing indicated by a two-dot chain line in FIG. 7.

Further, an intake cam angle sensor 22 (see FIG. 2) is disposed at an end of the intake cam shaft 41 on a side thereof remote from the variable intake cam phase mechanism 50. The intake cam angle sensor 22 delivers an INCAM signal, which is a pulse signal, to the ECU 2 along with rotation of the intake cam shaft 41 whenever the intake cam shaft 41 rotates through a predetermined cam angle (e.g. 1°). The ECU 2 calculates the intake cam phase CAIN based on the INCAM signal and a CRK signal, referred to hereinafter.

On the other hand, the exhaust-side valve-operating mechanism 60 is formed by a variable valve operating mechanism which steplessly changes the lift and valve timing of the exhaust valves 9. It should be noted that the phrase "the lift of the exhaust valves 9 (hereinafter referred to as the "exhaust lift") is intended to mean the maximum lift of the exhaust valves 9.

Figure 5:
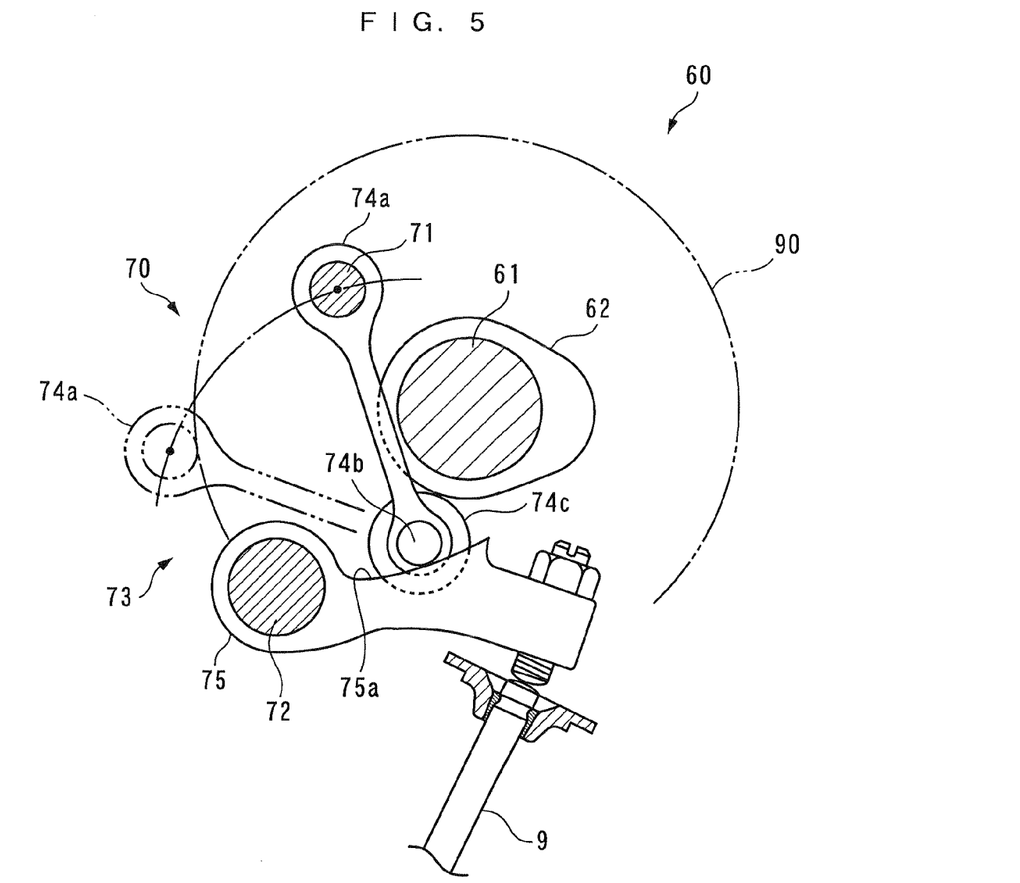
FIG. 5 A schematic view of an exhaust-side valve-operating mechanism.

As shown in FIG. 5, the exhaust-side valve-operating mechanism 60 is comprised of an exhaust cam shaft 61, an exhaust cam 62, a variable exhaust lift mechanism 70, and a variable exhaust cam phase mechanism 90.

The exhaust cam shaft 61 is connected to the crankshaft 3e via an exhaust sprocket and a timing chain (neither of which is shown), and rotates once whenever the crankshaft 3e rotates twice.

Figure 6:
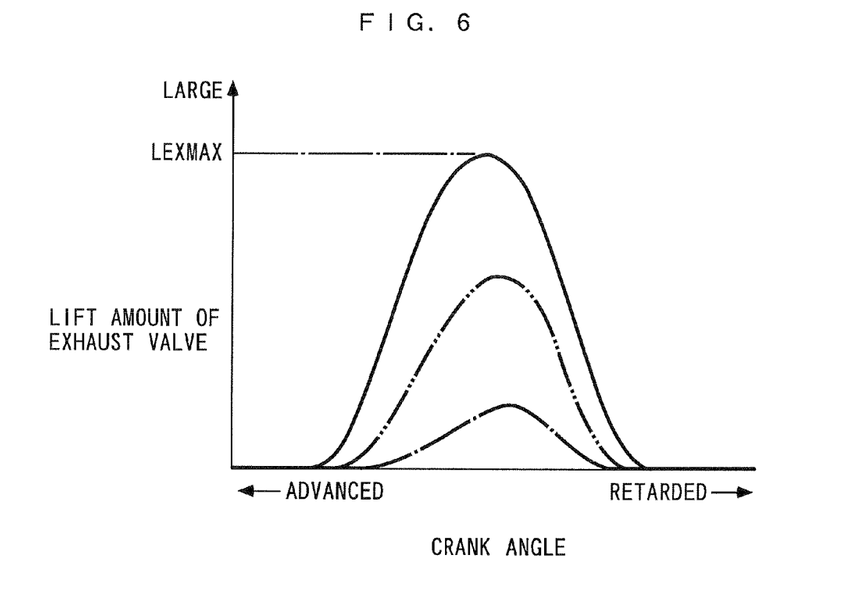
FIG. 6 A diagram showing changes in exhaust lift caused by a variable exhaust lift mechanism.
Figure 7:
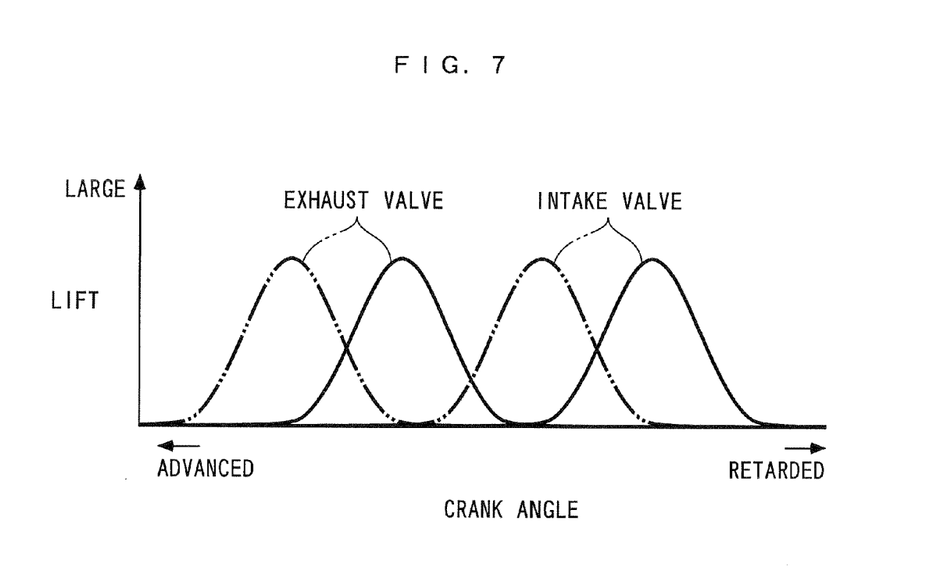
FIG. 7 A diagram showing a valve lift curve of an intake valve obtained by a variable intake cam phase mechanism and a valve lift curve of an exhaust valve obtained by a variable exhaust cam phase mechanism.

The variable exhaust lift mechanism 70 is configured to steplessly change the exhaust lift between a value of 0 and a predetermined maximum lift LEXMAX (see FIG. 6). The arrangement of the variable exhaust lift mechanism 70 is similar to that proposed in Japanese Laid-Open Patent Publication (Kokai) No. 2007-100522 by the present applicant, and hence hereinafter, a brief description will be given of the outline thereof.

The variable exhaust lift mechanism 70 is comprised of a control shaft 71, a rocker arm shaft 72, rocker arm mechanisms 73 which are provided on these shafts 71 and 72, for the respective cylinders 3a, an exhaust lift actuator 80 (see FIG. 2) which simultaneously drives these rocker arm mechanisms 73.

Figure 2:
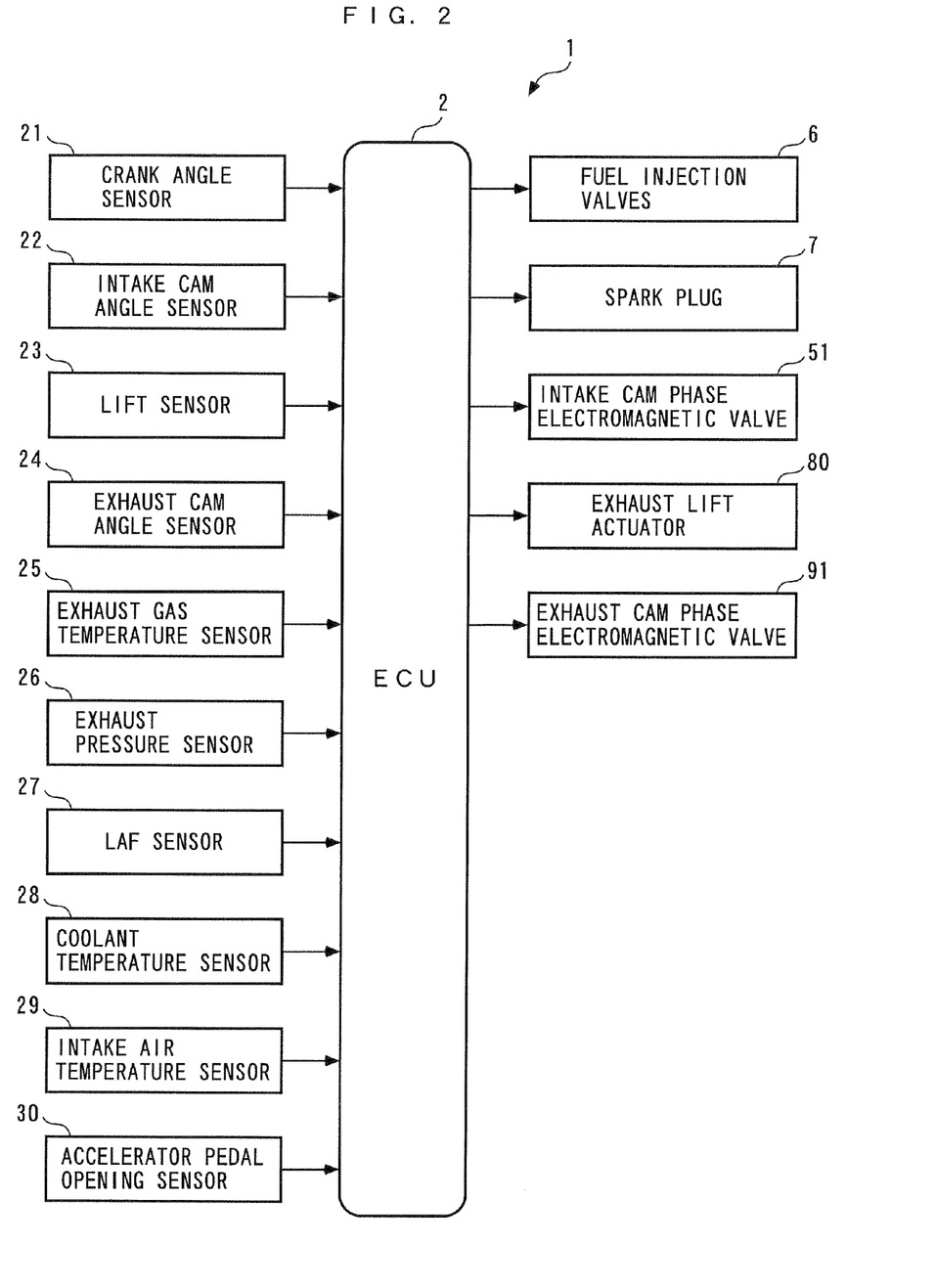
FIG. 2 A view of part of the control system.
Figure 3:
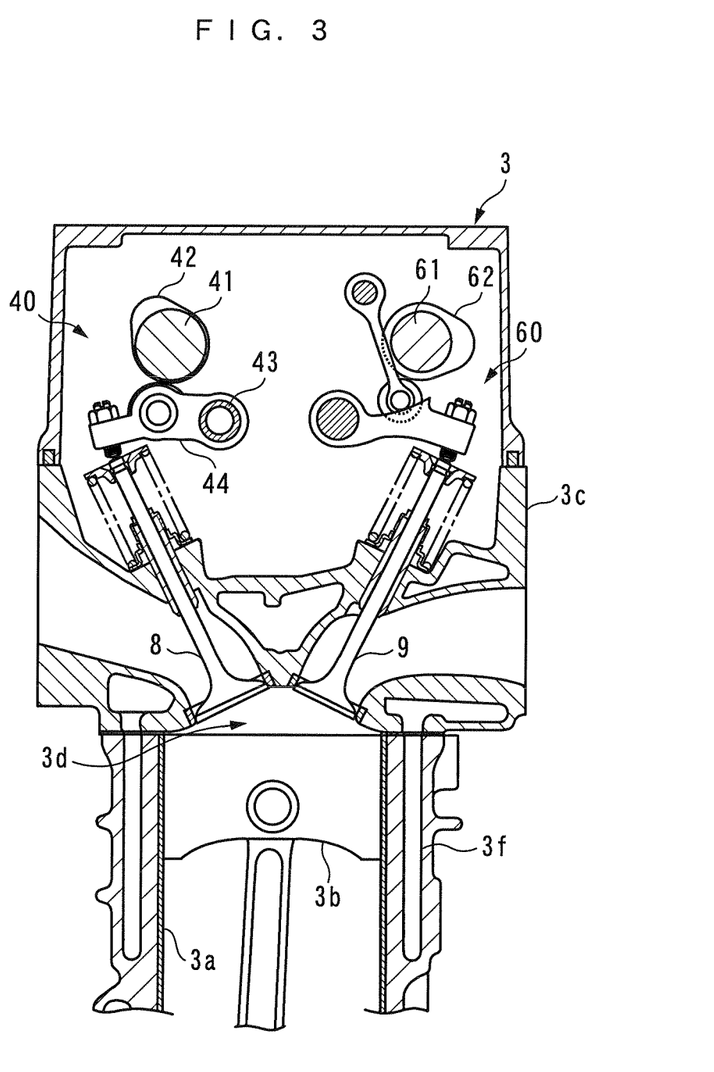
FIG. 3 A partial enlarged view of FIG. 1.

The rocker arm mechanisms 73 are each comprised of a link 74a, a roller shaft 74b, a roller 74c, and a rocker arm 75. Further, the exhaust lift actuator 80 is a combination of a motor and a reduction gear mechanism (neither of which is shown), and when the exhaust lift actuator 80 is driven by a lift control input U_SAAEX, referred to hereinafter, delivered from the ECU 2, the control shaft 71 is rotated, whereby the link 74a is pivoted about the roller shaft 74b.

When the link 74a is at a zero lift position indicated by a solid line in FIG. 5, if the roller 74c is pushed toward the rocker arm shaft 72 by the exhaust cam 62 along with rotation of the exhaust cam shaft 61, the link 74a is clockwise pivoted about the control shaft 71 as viewed in FIG. 5. At this time, the rocker arm 75 is held at a valve-closing position shown in FIG. 5 by the urging force of a valve spring since a guide surface 75a of the rocker arm 75 has a shape which coincides with an arc about the control shaft 71. Therefore, the exhaust lift is held at a value 0, and the exhaust valve 9 is held in a valve-closed state.

On the other hand, in a state in which the link 74a is pivoted from the zero lift position to the maximum lift position (position indicated by a two dot-chain line in FIG. 5) and is held thereat, if the link 74a is clockwise pivoted by rotation of the exhaust cam 62 about the control shaft 71 as viewed in FIG. 5, the rocker arm 75 is pivoted downward from the valve-closing position as viewed in FIG. 5, against the urging force of the valve spring to open the exhaust valve 9. At this time, the amount of pivotal motion, i.e. the exhaust lift of the rocker arm 75 becomes larger, as the link 74a is closer toward the maximum lift position.

With the above-described arrangement, as the link 74a is closer toward the maximum lift position, the exhaust valve 9 is opened with a larger lift. More specifically, during rotation of the exhaust cam 62, when the link 74a is at the maximum lift position, the exhaust valve 9 is opened along a valve lift curve indicated by a solid line illustrated in FIG. 6, and the exhaust lift thereof becomes equal to the maximum lift LEXMAX. Therefore, in this variable exhaust lift mechanism 70, by pivoting the link 74a between the zero lift position and the maximum lift position via the exhaust lift actuator 80, it is possible to steplessly vary the exhaust lift between the value of 0 and the predetermined maximum lift LEXMAX. Further, if an exhaust cam phase CAEX, referred to hereinafter, is the same, as the exhaust lift is larger, the valve-opening timing of the exhaust valve 9 becomes advanced, and the valve-closing timing thereof becomes retarded.

Further, the variable exhaust lift mechanism 70 is provided with a lift sensor 23 for detecting the exhaust lift (see FIG. 2). The lift sensor 23 detects a turning angle SAAEX of the control shaft 71, and delivers a signal indicative of the sensed turning angle SAAEX to the ECU 2. The exhaust lift is unconditionally determined from the turning angle SAAEX of the control shaft 71, and hence the detected turning angle SAAEX indicates an actual exhaust lift.

On the other hand, the variable exhaust cam phase mechanism 90 steplessly changes the phase CAEX of the exhaust cam shaft 61 relative to the crankshaft 3e (hereinafter referred to as the "exhaust cam phase") to an advanced side or a retarded side. The arrangement of the variable exhaust cam phase mechanism 90 is similar to that of the variable intake cam phase mechanism 50, and hence detailed description thereof is omitted. The variable exhaust cam phase mechanism 90 is comprised of an exhaust cam phase electromagnetic valve 91 (see FIG. 2), and an advancing chamber and a retarding chamber (neither of which is shown) into which oil pressure is supplied through the exhaust cam phase electromagnetic valve 91. The exhaust cam phase electromagnetic valve 91 continuously steplessly varies the exhaust cam phase CAEX between a predetermined most retarded value and a predetermined most advanced value, by varying oil pressure supplied to the advancing chamber and the retarding chamber according to an exhaust phase control input U_CAEX delivered from the ECU 2. This steplessly changes the valve timing of the exhaust valves 9 between the most retarded timing indicated by a solid line and the most advanced timing indicated by a two-dot chain line in FIG. 7.

Further, an exhaust cam angle sensor 24 (see FIG. 2) is disposed at an end of the exhaust cam shaft 61 on a side thereof remote from the variable exhaust cam phase mechanism 90. The exhaust cam angle sensor 24 delivers an EXCAM signal, which is a pulse signal, to the ECU 2 along with rotation of the exhaust cam shaft 61 whenever the exhaust cam shaft 61 rotates through a predetermined cam angle (e.g. 1°). The ECU 2 calculates the exhaust cam phase CAEX based on the EXCAM signal and the CRK signal, referred to hereinafter.

As described above, in the engine 3, the lift and valve timing of the exhaust valves 9 are steplessly changed by the exhaust-side valve-operating mechanism 60, whereby the amount of combustion gases caused to remain in each cylinder 3a, i.e. an internal EGR amount is controlled by closing each exhaust valve 9 before the associated piston 3b reaches the TDC at the start of the intake stroke thereof (hereinafter referred to as "pre-intake TDC").

The engine 3 is provided with a crank angle sensor 21. The crank angle sensor 21 is formed by a magnet rotor and an MRE pickup (neither of which is shown), and delivers the CRK signal and a TDC signal, which are both pulse signals, to the ECU 2 along with rotation of the crankshaft 3e.

Each pulse of the CRK signal is generated whenever the crankshaft 3e rotates through a predetermined crank angle (e.g. 30°). The ECU 2 calculates rotational speed (hereinafter referred to as the "engine speed") NE of the engine 3 based on the CRK signal. Further, the TDC signal indicates that a piston 3b of each cylinder 3a is at a predetermined crank angle position in the vicinity of TDC (top dead center) at the start of the intake stroke thereof, and in the case of the four-cylinder engine of the present embodiment, a pulse thereof is delivered whenever the crankshaft rotates through 180 degrees. Further, the engine 3 is provided with a cylinder discrimination sensor (not shown), which delivers a cylinder discrimination signal which is a pulse signal for discriminating each cylinder 3a to the ECU 2. The ECU 2 calculates a crank angle CA for each cylinder 3a, based on the cylinder discrimination signal, the CRK signal, and the TDC signal.

Further, the exhaust pipe 5 of the engine 3 is provided with an exhaust gas temperature sensor 25, an exhaust pressure sensor 26, and a LAF sensor 27 at respective locations from upstream to downstream in the mentioned order. The exhaust gas temperature sensor 25 detects temperature in the exhaust pipe 5 (hereinafter referred to as the "exhaust gas temperature") TEX, and the exhaust pressure sensor 26 detects pressure in the exhaust pipe 5 (hereinafter referred to as the "exhaust pressure") PEX, whereby signals indicative of the sensed exhaust gas temperature and the sensed exhaust pressure are delivered to the ECU 2. The LAF sensor 27 linearly detects the concentration of oxygen in exhaust gases flowing through the exhaust pipe 5, in a broad air-fuel ratio range from a rich region richer than the stoichiometric ratio to a very lean region, to deliver a detection signal indicative of the sensed oxygen concentration to the ECU 2. The ECU 2 calculates an air-fuel ratio of exhaust gases, i.e. an air-fuel ratio AF of an air-fuel mixture based on the detection signal output from the LAF sensor 27.

The body of the engine 3 is provided with a coolant temperature sensor 28. The coolant temperature sensor 28 detects the temperature of engine coolant (hereinafter referred to as the "engine coolant temperature") TW circulating through a cylinder block 3f of the engine 3, and delivers a signal indicative of the sensed engine coolant temperature TW to the ECU 2.

The intake pipe 4 of the engine 3 is provided with an intake air temperature sensor 29. The intake air temperature sensor 29 detects an intake air temperature TA, and delivers a signal indicative of the sensed intake air temperature TA to the ECU 2.

Further, an accelerator pedal opening sensor 30 detects the stepped-on amount of an accelerator pedal, not shown, (hereinafter referred to as the "accelerator pedal opening") AP, and delivers a signal indicative of the sensed accelerator pedal opening AP to the ECU 2.

The ECU 2 is implemented by a microcomputer comprised of an I/O interface, a CPU, a RAM, and a ROM (none of which are specifically shown). The ECU 2 carries out control of the engine 3, including control of the fuel injection amount, based on control programs stored in the ROM according to the signals from the aforementioned various sensors 21 to 30. Further, the ECU 2 sets the combustion mode of the engine 3 to either of an SI combustion mode and a CI combustion mode based on the operating conditions of the engine 3. In the present embodiment, it should be noted that in the SI combustion mode, a homogeneous mixture is generated by injecting fuel from the fuel injection valve 6 during the intake stroke, and spark ignition is caused by the spark plug 7, while in the CI combustion mode, a stratified mixture is formed by injecting fuel from the fuel injection valve 6 only during the compression stroke, and self-ignition combustion is performed. Further, the ECU 2 controls the exhaust-side valve-operating mechanism 60 according to the determined combustion mode to thereby change the valve-closing timing of each exhaust valve 9 to control the internal EGR amount and control the intake-side valve-operating mechanism 40 according to the valve-closing timing of the exhaust valve 9 to change the valve-opening timing of the associated intake valve 8.

In the present embodiment, the ECU 2 corresponds to target valve-opening timing-setting means, control means, operating condition-detecting means, target valve-closing timing-setting means, actual valve-closing timing-detecting means, and switching determining means.

Figure 8:
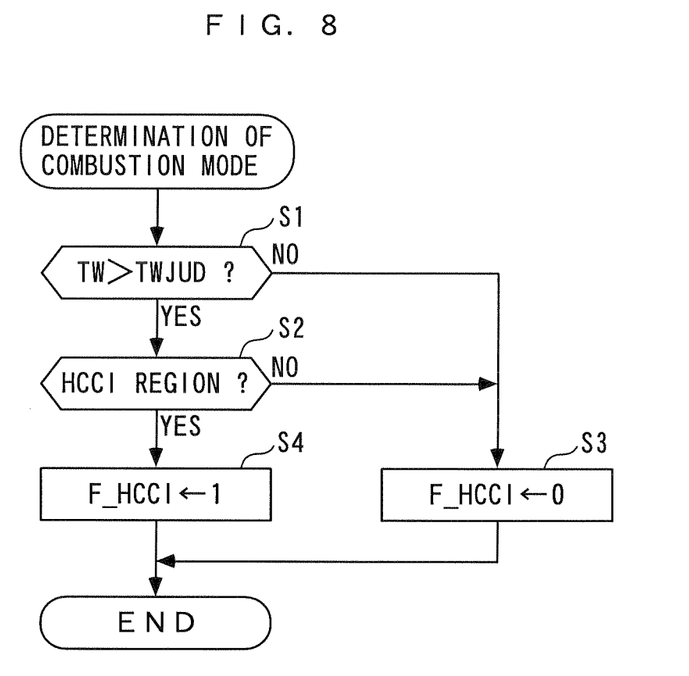
FIG. 8 A flowchart showing a process for determining a combustion mode.

FIG. 8 is a flowchart showing a process executed by the ECU 2, for determining a combustion mode. This process is executed in synchronism with generation of the TDC signal. First, in a step 1 (shown as "S1"; the following steps are also shown in the same way), it is determined whether or not the detected engine coolant temperature TW is higher than a predetermined temperature TWJUD (e.g. 85° C.). If the answer to this question is negative (NO), i.e. if the engine coolant temperature TW is not higher than the predetermined temperature TWJUD, it is judged that the temperature within the combustion chamber 3d suitable for CI combustion has not been secured, so that the combustion mode is determined to be set to the SI combustion mode, and set a CI combustion mode flag F_HCCI to 0 to indicate the setting (step 3), followed by terminating the present process.

Figure 9:
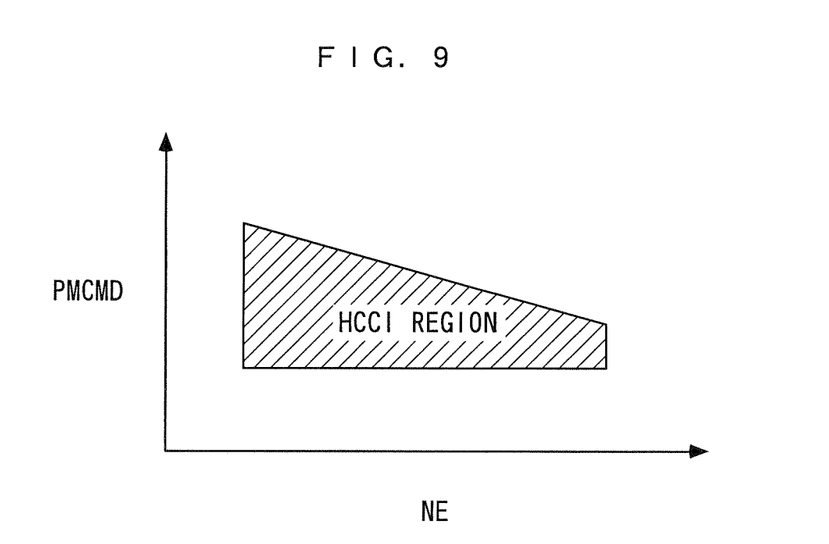
FIG. 9 A diagram showing an example of a combustion region map for use in the process shown in FIG. 8.

On the other hand, if the answer to the question of the step 1 is affirmative (YES), it is determined whether or not the engine 3 is in an operating region (hereinafter referred to as "HCCI region") wherein the CI combustion is to be executed (step 2). This determination is performed based on an operating region map shown in FIG. 9 according to the engine speed NE and demanded torque PMCMD. The HCCI region in the combustion region map is an operating region wherein the CI combustion is to be executed, which corresponds to an operating region wherein the engine speed NE is in a low-to-medium speed region, and the demanded torque PMCMD is a low-to-medium load region. It should be noted that the demanded torque PMCMD is calculated by searching a map (not shown) according to the engine speed NE and the accelerator pedal opening AP.

If the answer to the question of the step 2 is negative (NO), i.e. if the engine 3 is not in the HCCI region, the step 3 is executed to select the SI combustion mode. On the other hand, if the answer to the question of the step 2 is affirmative (YES), i.e. if the engine 3 is in the HCCI region, the combustion mode is determined to be set to the CI combustion mode, and the CI combustion mode flag F_HCCI is set to 1 to indicate the setting (step 4), followed by terminating the present process.

Figure 10:
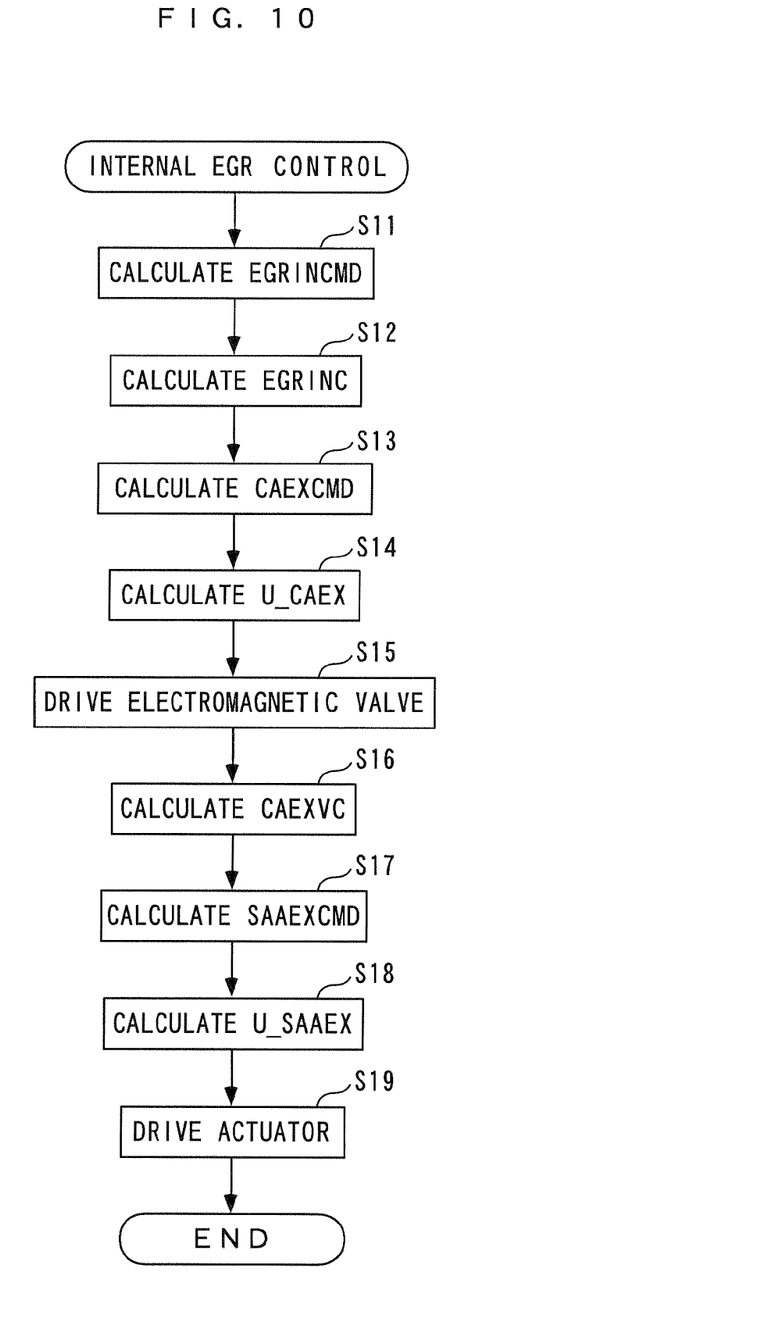
FIG. 10 A flowchart showing a process for controlling internal EGR.

FIG. 10 is a flowchart showing a process for controlling the internal EGR. This process is also executed in synchronism with generation of the TDC signal. As described hereinabove, the internal EGR is performed by closing each exhaust valve 9 before the associated piston 3b reaches the pre-intake TDC. In the present process, first, in a step 11, a target internal EGR amount EGRINCMD serving as a target of the internal EGR amount is calculated according to the engine speed NE and the demanded torque PMCMD.

Next, the target internal EGR amount EGRINCMD is corrected according to the detected exhaust gas temperature TEX and exhaust pressure PEX using a characteristic equation of gas (PV=nRT) to thereby calculate a final target internal EGR amount EGRINC (step 12).

Next, a map (not shown) is searched according to the calculated target internal EGR amount EGRINC and the engine speed NE to thereby calculate a target exhaust cam phase CAEXCMD serving as a target of the exhaust cam phase CAEX (step 13). Then, the exhaust phase control input U_CAEX is calculated according to the calculated target exhaust cam phase CAEXCMD and the detected actual exhaust cam phase CAEX (step 14), and the exhaust cam phase electromagnetic valve 91 is driven according to the calculated exhaust phase control input U_CAEX (step 15). Thus, the exhaust cam phase CAEX is controlled such that it becomes equal to the target exhaust cam phase CAEXCMD.

Next, a table (not shown) is searched according to the calculated target internal EGR amount EGRINC, to thereby calculate a target valve-closing crank angle CAEXVC corresponding to the target valve-closing timing of each exhaust valve 9 (step 16), and then a target turning angle SAAEXCMD serving as a target of the turning angle SAAEX of the control shaft 71 is calculated according to the target valve-closing crank angle CAEXVC and the exhaust cam phase CAEX (step 17).

Next, the lift control input U_SAAEX is calculated according to the turning angle SAAEX and the target turning angle SAAEXCMD (step 18). Then, the exhaust lift actuator 80 is driven according to the lift control input U_SAAEX (step 19). Thus, the turning angle SAAEX is controlled such that it becomes equal to the target turning angle SAAEXCMD.

Figure 11:
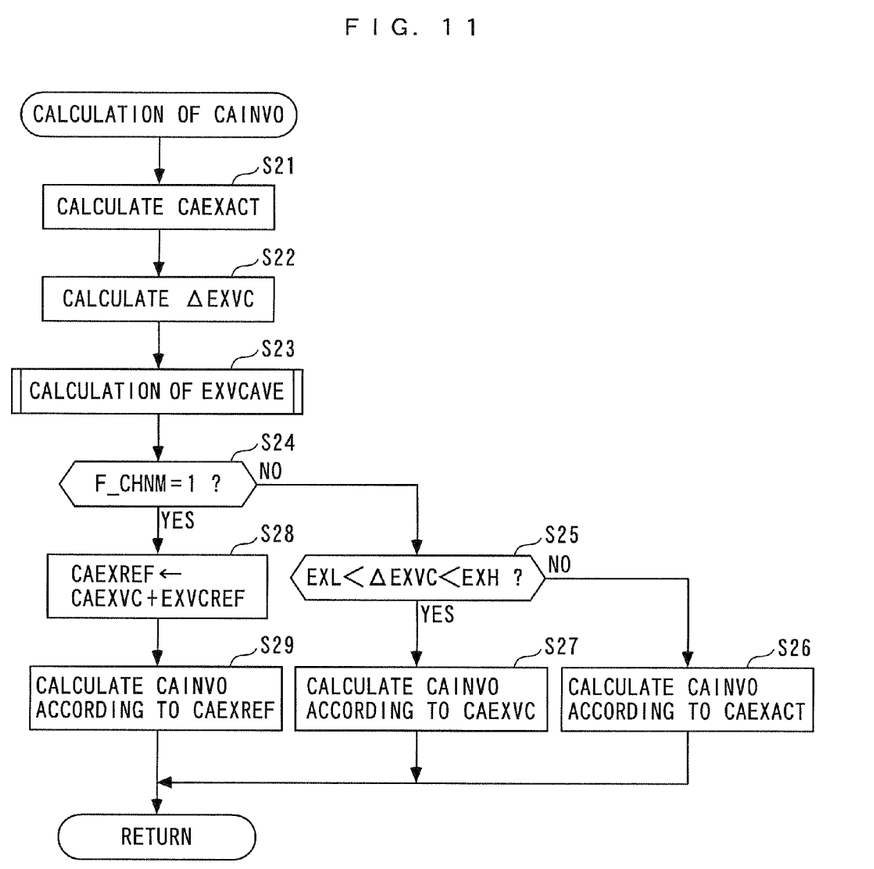
FIG. 11 A flowchart showing a process for calculating a valve-opening crank angle for an intake valve.

FIG. 11 is a flowchart showing a process for calculating a valve-opening crank angle CAINVO corresponding to a target valve-opening timing serving as a target of the valve-opening timing of each intake valve 8. In this process, first, in a step 21, an actual valve-closing crank angle CAEXACT corresponding to the actual valve-closing timing of the exhaust valve 9 is calculated according to the turning angle SAEEX detected by the lift sensor 23 and the exhaust cam phase CAEX detected by the exhaust cam angle sensor 24. Next, the target valve-closing crank angle CAEXVC calculated in the step 16 is subtracted from the actual valve-closing crank angle CAEXACT (=CAEXACT−CAEXVC) to thereby calculate a difference ΔEXVC therebetween (step 22), and an average value EXVCAVE is calculated using the difference ΔEXVC (step 23).

Figure 12:
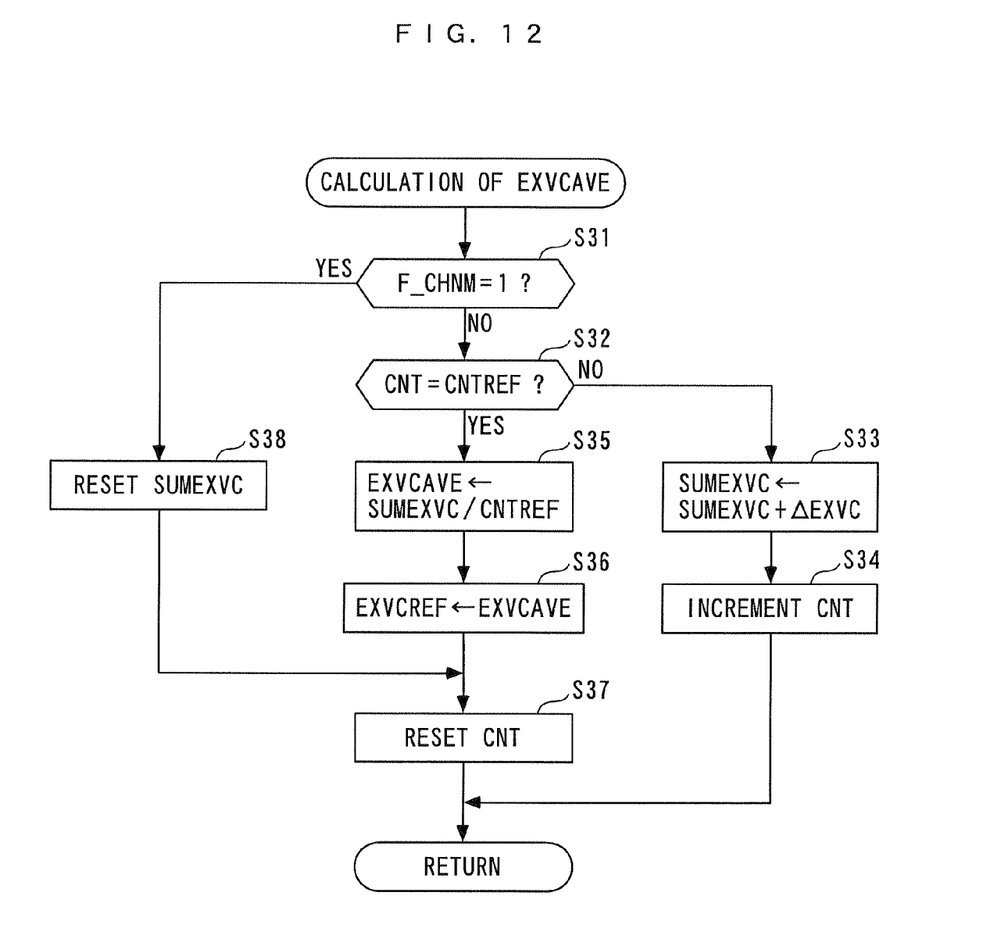
FIG. 12 A flowchart showing a process for calculating an average value.

FIG. 12 is a flowchart showing a process for calculating the average value EXVCAVE. In this process, first, in a step 31, it is determined whether or not a combustion mode-switching flag F_CHNM is equal to 1.

Figure 13:
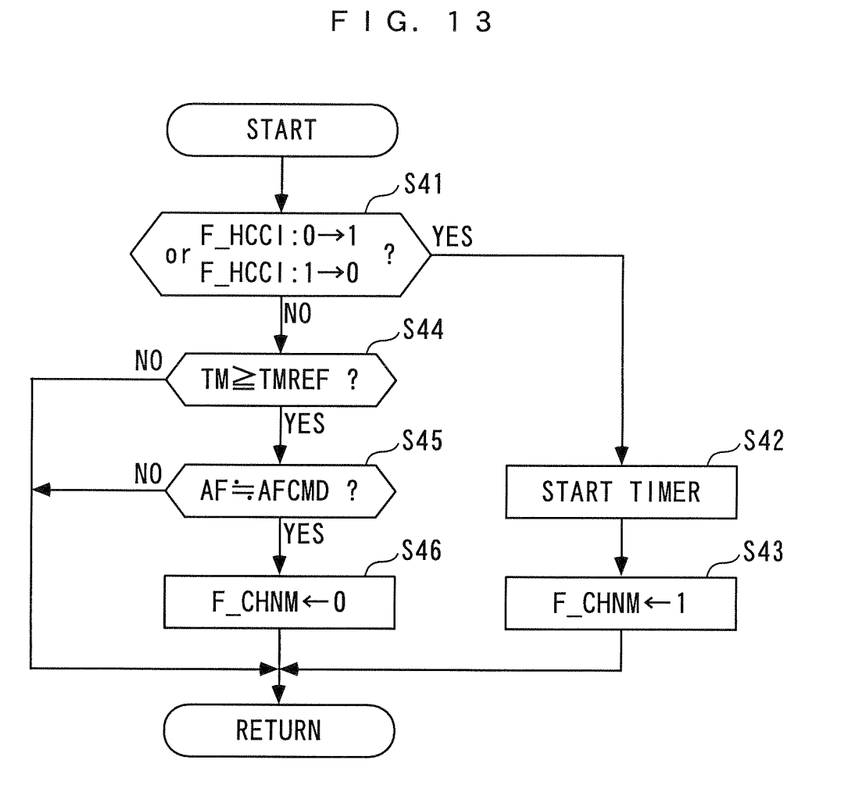
FIG. 13 A flowchart showing a process for setting a combustion mode-switching flag.

FIG. 13 is a flowchart showing a process for setting the combustion mode-switching flag F_CHNM. In this process, first, in a step 41, it is determined whether or not the CI combustion mode flag F_HCCI has been changed from 0 to 1 or from 1 to 0 between the immediately preceding loop and the present loop. If the answer to this question is affirmative (YES), i.e. if switching of the combustion mode between the SI combustion mode and the CI combustion mode has just been set, a timer (not shown) is started (step 42), and to indicate that the combustion mode is being switched, the combustion mode-switching flag F_CHNM is set to 1 (step 43), followed by terminating the present process.

On the other hand, if the answer to the question of the step 41 is negative (NO), it is determined whether or not a timer value TM of the timer is not less than a predetermined value TMREF (step 44). If the answer to this question is negative (NO), i.e. if a predetermined time period has not elapsed after a change in the CI combustion mode flag F_HCCI, it is judged that the combustion mode is being switched, and the process is immediately terminated.

Further, if the answer to the question of the step 44 is affirmative (YES), it is determined whether or not the detected air-fuel ratio AF is substantially equal to a target air-fuel ratio AFCMD (step 45). The target air-fuel ratio AFCMD is calculated by searching a map (not shown) according to the combustion mode, the engine speed NE and the demanded torque PMCMD. If the answer to this question is negative (NO), it means that the air-fuel ratio AF has not yet converged to the target air-fuel ratio AFCMD for the resulting combustion mode which has been set, and hence it is judged that the combustion mode being switched, so that the present process is immediately terminated.

On the other hand, if the answer to the question of the step 45 is affirmative (YES), i.e. if the air-fuel ratio AF is substantially equal to the target air-fuel ratio AFCMD, it is judged that the switching of the combustion mode has been completed, and to indicate this fact, the combustion mode-switching flag is reset to 0 (step 46), followed by terminating the present process.

Referring back to FIG. 12, if the answer to the question of the step 31 is negative (NO), i.e. if the combustion mode is not being switched, it is determined whether or not a counter value CNT of a counter (not shown) for counting the number of times of integration of the difference ΔEXVC is equal to a predetermined value CNTREF (e.g. 10) (step 32). If the answer to this question is negative (NO), the difference ΔEXVC calculated in the step 22 is added to the immediately preceding value of an integrated value SUMEXVC to thereby calculate the present value of the integrated value SUMEXVC (step 33), and then the counter CNT is incremented (step 34), followed by terminating the present process.

On the other hand, if the answer to the question of the step 32 is affirmative (YES), i.e. if the counter value CNT has reached the predetermined value CNTREF, the integrated value SUMEXVC is divided by the predetermined value CNTREF (=SUMEXVC/CNTREF) to thereby calculate the average value EXVCAVE (step 35). Then, the average value EXVCAVE is set as a correction value EXVCREF (step 36), and then the counter value CNT is reset to 0 (step 37), followed by terminating the present process.

On the other hand, if the answer to the question of the step 31 is affirmative (YES), i.e. if the combustion mode is being switched, the integrated value SUMEXVC is reset to 0 (step 38), and then the step 37 is executed.

Referring again to FIG. 11, in a step 24 following the step 23, it is determined whether or not the combustion mode-switching flag F_CHNM is equal to 1. If the answer to this question is negative (NO), i.e. if the combustion mode is not being switched, it is determined whether or not the difference ΔEXVC is between a predetermined lower limit value EXL and a predetermined upper limit value EXH (step 25). If the answer to this question is negative (NO), it is judged that deviation of the actual valve-closing crank angle CAEXACT from the target valve-closing crank angle CAEXVC is large, so that the valve-opening crank angle CAINVO of the intake valve 8 is calculated by searching a table (not shown) according to the actual valve-closing crank angle CAEXACT of the exhaust valve 9 (step 26), followed by terminating the present process. It should be noted that in this table, the valve-opening crank angle CAINVO is set such that a crank angle from the pre-intake TDC thereto is equal to a crank angle from the actual valve-closing crank angle CAEXACT to the pre-intake TDC.

On the other hand, if the answer to the question of the step 25 is affirmative (YES), i.e. if the deviation of the actual valve-closing crank angle CAEXACT from the target valve-closing crank angle CAEXVC is small, the valve-opening crank angle CAINVO is calculated by searching a table (not shown) according to the target valve-closing crank angle CAEXVC (step 27), followed by terminating the present process. In this table as well, the valve-opening crank angle CAINVO is set such that the crank angle from the pre-intake TDC thereto is equal to a crank angle from the target valve-closing crank angle CAEXVC to the pre-intake TDC.

On the other hand, if the answer to the question of the step 24 is affirmative (YES), i.e. if the combustion mode is being switched, the correction value EXVCREF set in the step 36 is added to the target valve-closing crank angle CAEXVC to thereby calculate a corrected valve-closing crank angle CAEXREF (step 28). Then, a table (not shown) is searched according to the corrected valve-closing crank angle CAEXREF to thereby calculate the valve-opening crank angle CAINVO (step 29), followed by terminating the present process. In this table as well, the valve-opening crank angle CAINVO is set such that the crank angle from the pre-intake TDC thereto is equal to a crank angle from the corrected valve-closing crank angle CAEXREF to the pre-intake TDC.

According to the valve-opening crank angel CAINVO thus calculated, a target intake cam phase CAINCMD serving as a target of the intake cam phase CAIN is calculated, and according to the target intake cam phase CAINCMD and the intake cam phase CAIN, the intake phase control input U_CAIN is calculated. Then, the intake cam phase electromagnetic valve 51 is driven according to the intake phase control input U_CAIN, whereby the intake cam phase CAIN is controlled such that the intake cam phase CAIN becomes equal to the target intake cam phase CAINCMD.

As described above, according to the present embodiment, the valve-opening crank angle CAINVO of each intake valve 8 is set such that the crank angle from the pre-intake TDC becomes equal to a crank angle from the valve-closing crank angle of the exhaust valve 9 (actual valve-closing crank angle CAEXACT, target valve-closing crank angle CAEXVC or corrected valve-closing crank angle CAEXREF) to the pre-intake TDC. This makes it possible to open the intake valve 8 in optimum timing in which energy generated by reciprocating motion of the piston 3b is cancelled out. As a result, pumping loss and the blow-back of combustion gases are reduced to make the intake air amount stable, whereby it is possible to secure excellent drivability.

Further, when the actual valve-closing crank angle CAEXACT of the exhaust valve 9 largely deviates from the target valve-closing crank angle CAEXVC, the actual valve-closing crank angle CAEXACT is employed as the valve-closing crank angle of the exhaust valve 9 for use in setting the valve-opening crank angle CAINVO of the intake valve 8 (step 26). Therefore, it is possible to appropriately control the valve-opening timing of the intake valve 8 according to the actual valve-closing timing of the exhaust valve 9. On the other hand, when the actual valve-closing crank angle CAEXACT of the exhaust valve 9 is substantially equal to the target valve-closing crank angle CAEXVC, the target valve-closing crank angle CAEXVC is employed as the valve-closing crank angle (step 27). Therefore, even when the actual valve-closing crank angle CAEXACT temporarily fluctuates, it is possible to appropriately control the valve-opening timing of the intake valve 8 in a stable manner, in a state in which influence caused thereby is eliminated.

Further, during switching of the combustion mode, the corrected valve-closing crank angle CAEXREF obtained by adding the correction value EXVCREF to the target valve-closing crank angle CAEXVC is used as the valve-closing crank angle (step 29). Therefore, even when the actual valve-closing timing of the exhaust valve 9 temporarily deviates, it is possible to appropriately control the valve-opening timing of the intake valve 8, in a state in which influence caused thereby is eliminated.

Further, the calculation of the average value EXVCAVE for use in calculation of the corrected valve-closing crank angle CAEXREF is performed except during switching of the combustion mode, and hence even when large deviation of the actual valve-closing crank angle CAEXACT from the target valve-closing crank angle CAEXVC is caused by the switching of the combustion mode, the influence on the calculation caused thereby is eliminated, which makes it possible to obtain a highly accurate corrected valve-closing crank angle CAEXREF.

It should be noted that the present invention is not limited to the described embodiment, but it can be practiced in various forms. For example, although in the present embodiment, the valve-opening timing of the intake valve 8 is changed only by the variable intake cam phase mechanism, but instead of this or in combination with this, it may be changed by a variable lift control mechanism for the intake valve. Further, in the present embodiment, the difference between the actual valve-closing crank angle CAEXACT and the target valve-closing crank angle CAEXVC is used as a result of comparison between the actual valve-closing timing and the target valve-closing timing of the exhaust valve 9, this is not limitative, but the ratio between them may be used.

Further, although in the present embodiment, the corrected valve-closing crank angel CAEXREF is calculated by adding the average value EXVCAVE of the difference ΔEXVC between the actual valve-closing crank angle CAEXACT and the target valve-closing crank angle CAEXVC to the target valve-closing crank angle CAEXVC, this is not limitative, but it may be calculated by subtracting the average value EXVCAVE of the difference ΔEXVC between the target valve-closing crank angle CAEXVC and the actual valve-closing crank angle CAEXACT from the actual valve-closing crank angle CAEXACT. The corrected valve-closing crank angle thus calculated is substantially the same as that in the present embodiment, and the same advantageous effects as provided by the embodiment can be obtained.

Furthermore, the embodiment is an example of application of the present invention to the engine 3 in which the combustion mode can be switched between the compression ignition combustion mode and the spark ignition combustion mode, the present invention is applicable to other engines in which the combustion mode can be switched between a plurality of combustion modes other than these, e.g. between the three of a homogeneous combustion mode, a stratified self-ignition combustion mode, and a stratified spark-ignition combustion mode.

Further, although in the above-described embodiments, the present invention is applied to the gasoline engine installed on an automotive vehicle by way of example, this is not limitative, but it can be applied to various types of engines, such as diesel engines other than gasoline engine, and engines for other than automotive vehicles, such as engines for ship propulsion machines, e.g. an outboard motor having a vertically-disposed crankshaft. Further, it is possible to change details of the construction of the embodiment within the spirit and scope of the present invention.

INDUSTRIAL APPLICABILITY

As described hereinabove, the control system for the internal combustion engine, according to the present invention, can be applied to various internal combustion engines, as a control system therefor which is capable of providing a stable intake air amount through reduction of pumping loss and the blow-back of combustion gases by appropriately controlling the valve-opening timing of intake valves, and thereby being capable of securing excellent drivability.

The invention claimed is:

1. A control system for an internal combustion engine, for controlling internal EGR in which combustion gases are caused to remain in a cylinder by closing an exhaust valve before a piston reaches a top dead center, the engine having as a combustion mode, a homogeneous combustion mode and a stratified combustion mode, the system comprising:

an exhaust-side variable valve-operating mechanism that controls an internal EGR amount by changing valve-closing timing of the exhaust valve;

an intake-side variable valve-operating mechanism that changes valve-opening timing of an intake valve of the engine;

target valve-opening timing-setting means for setting target valve-opening timing serving as a target of the valve-opening timing of the intake valve, such that length of a time period from the top dead center of the piston to the valve-opening timing of the intake valve becomes equal to length of a time period from the valve-closing timing of the exhaust valve to the top dead center;

control means for controlling said intake-side variable valve-operating mechanism based on the set target valve-opening timing;

operating condition-detecting means for detecting an operating condition of the engine;

switching determining means for determining whether or not the combustion mode is being switched;

target valve-closing timing-setting means for setting target valve-closing timing serving as a target of the valve-closing timing of the exhaust valve, according to the detected operating condition of the engine; and actual valve-closing timing-detecting means for detecting actual valve-closing timing of the exhaust valve, wherein said target valve-opening timing-setting means uses one of the actual valve-closing timing and the target valve-closing timing of the exhaust valve as the valve-closing timing of the exhaust valve, based on a result of comparison between the actual valve-closing timing and the target valve-closing timing of the exhaust valve, and wherein said target valve-opening timing-setting means calculates an average value of a difference between the actual valve-closing timing and the target valve-closing timing of the exhaust valve, and when it is determined that the combustion mode is being switched, uses a value obtained by adding the average value to the target valve-closing timing of the exhaust valve, as the valve-closing timing of the exhaust valve.

\* \* \* \* \*